Oct. 10, 1933.                J. E. SUMPTER                 1,930,154
                              CABLE CONNECTION
                           Filed Sept. 29, 1926           2 Sheets-Sheet 1

Inventor
John E. Sumpter
By Howard Piels
    Attorney

Oct. 10, 1933.    J. E. SUMPTER    1,930,154
CABLE CONNECTION
Filed Sept. 29, 1926    2 Sheets-Sheet 2
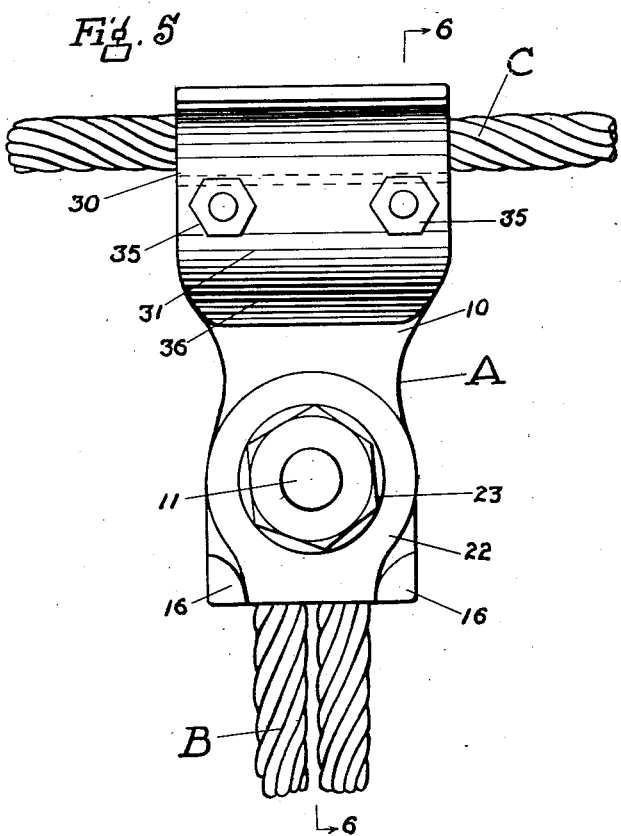
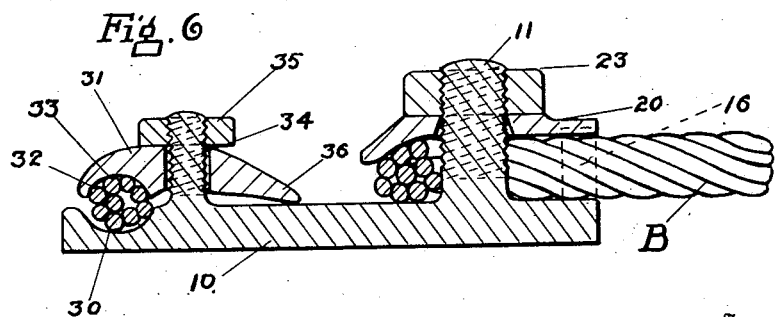
Inventor
John E. Sumpter
By Horace Finch
Attorney Patented Oct. 10, 1933

1,930,154

UNITED STATES PATENT OFFICE 1,930,154

CABLE CONNECTION

John E. Sumpter, Minneapolis, Minn., assignor to Delta-Star Electric Company, Chicago, Ill., a corporation of Illinois Application September 29, 1926
Serial No. 138,398

3 Claims. (Cl. 173—353)

My invention relates to a compression and connecting lug for electrical cables or other cables where a substantial connection is adapted to be made in a simple manner to secure the end of the cable to a low loss connection.

A feature of my invention resides in an electrical connection lug for a cable with a compressing means held in position by a locking nut in a manner so that the electrical loss is very low and, in fact, it is so low as to make my connection preferable over many other connections for electrical cables.

Invention also includes a cable attaching and securing means wherein, the lug about which the cable is adapted to be wrapped, projects upwardly from the attaching plate adjacent to a pair of side holding lugs so that the cable can be formed over the supporting lug and between the holding lugs very readily in a convenient manner and the compressor held in place by the locking nut to compress the cable at and about the supporting lug and between the guide lugs adjacent to the holding lugs. This construction provides a wide bearing so that the cable may be squeezed very firmly against the securing plate and compressed by the compressing member to force the cable closely about the attaching and supporting lug, thereby making an electrical connection of a very desirable nature.

A feature of my invention is in the simplicity of manufacture and the smoothness of the design, wherein the attaching and supporting lug may be a separate bolt or in integral formation of the plate. The particular design of my compressing and connecting lug makes it necessary to wrap the cable or wire about the lug to practically a complete circle or loop, the ends projecting between the supporting lugs on the cable so that the lugs assist in holding the cable after it has been formed over the center attaching lug even without the compressing and locking member in place. This permits electrical connections of cables which are very desirable.

It is also an object of my invention to provide a compressor with a concave inner surface which is adapted to press against the cable which is attached to the lug in a manner to press the cable closely about the attaching lug and I provide a projecting lip on the compressor which extends between the lugs and compresses and secures the cable very firmly in place. This form and shape of a compressing lug, also, adds to the design to provide a wide rigid and firm securing connection which overcomes the electrical loss very largely in the use of my connection for electrical means.

My invention also includes means for holding the compressor against rotation and in a position to contact with the largest surface of the connecting cable.

It is an important feature of my invention to provide forming lugs which are separated from the supporting stud or bolt so that a cable, even of a heavy nature, can be formed accurately about the stud and extended between the lugs. This permits electrical connections to be made with heavy cables very quickly and accurately, and also with a neat desirable connection. I provide the body or plate which supports the stud or lug of my connector together with the compressor plate and locking nut of very high conductive material, thereby obtaining the least possible loss across the joints, in fact when one is drawn into position, the compressor firmly holds the parts together as to practically form a solid connection between the parts. A preferable construction is where the plate with the stud is formed with an integral formation, however, this is not essential particularly where the stud may be of a separate bolt without departing from the spirit of my invention.

A feature of my invention also resides in a means of providing a connection for cable ends and for providing a strain clamp for securing cables together or for connecting cables in such a manner to hold a heavy load if it is desired. My connection includes a clamp which may be used to connect the cables, one of which may extend transversely or approximately at right angles to the other or at any angular relation one to the other. This permits electrical connections of large copper cables adapted to carry the electrical load with a small loss and to overcome the necessity of soldering the joints by so firmly clamping the cables together as to provide a low loss electrical connection.

These objects and details of my invention together with the other features, objects and advantages will be more fully and clearly said in the specification and claims.

In the drawings forming part of this specification:

Figure 5 is a front view of another form of my invention where transversely extending cables may be connected.

Figure 6 is a section on the line 6—6 of Figure 5.

Figure 1:
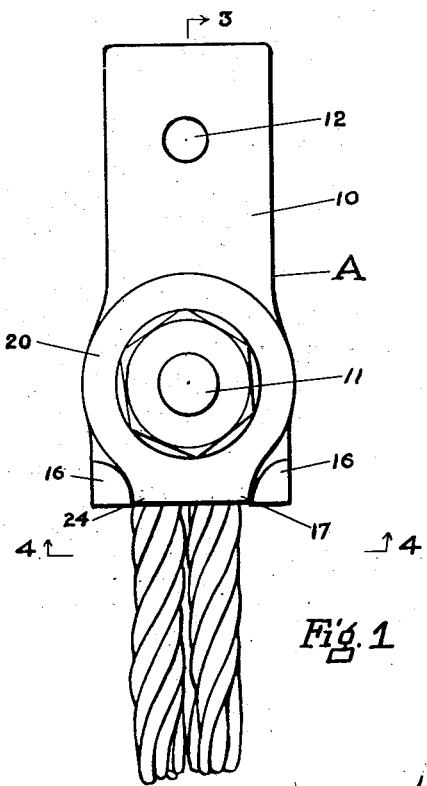
Figure 1 is a plan view of my connection as it would appear of use.

My compressor and connecting lug A is designed of a material being readily conductive of electric current as the connector is very adaptable for connecting an electrical cable, however, my compressible connector may be used for attaching cables or wires other than those used for electrical purposes.

The connector A is provided with a back or body plate 10 having a stud 11 projecting therefrom and designed so that the plate may be attached through the opening 12 to any suitable connection. It is desirable in electrical connections where a connector such as A is to be used, that the plate can be flat or smooth along the bolt 13 so that it can be readily attached to make various connections.

The plate 10 is designed and provided with an enlarged portion 14 extending about the stud or bolt 11 and having projecting from one side an angular portion 15 from which projects upwardly the forming lug 16.

Figure 2:
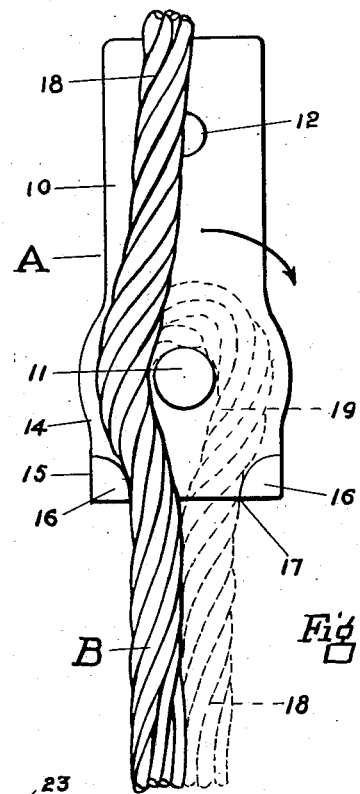
Figure 2 is a plan view of the supporting plate showing the connection of a cable to the stud and illustrating the formation of the forming lugs along with the compressing plate and nut removed.
Figure 3:
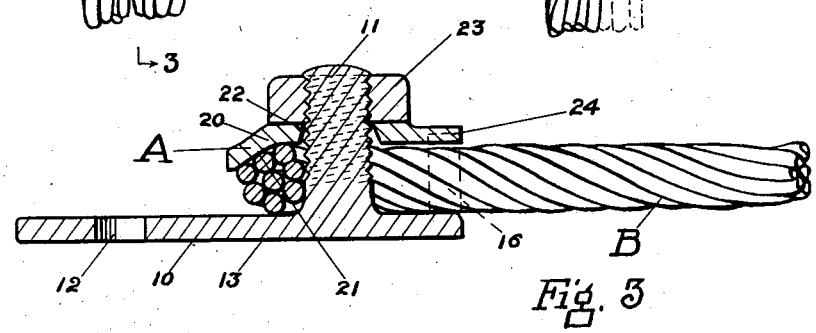
Figure 3 is a section on the line 3—3, Figure 1.
Figure 4:
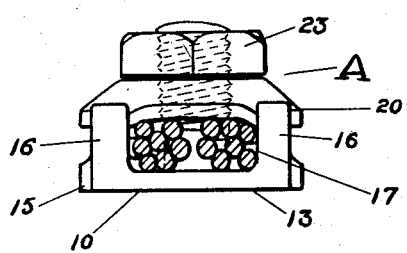
Figure 4 is a section on the line 4—4, section 1.

Lugs 16 are formed at the corners of the projecting portions 15 and are spaced apart so as to provide a cable receiving space 17 between the lugs. These forming lugs 16 permit the cable B to be laid in the space 17 with the free end 18 of the same extending backward over the plate 10 and then, by bending the cable in the direction of the arrow, as is indicated in the dotted outline in Figure 2, the cable B is formed in a complete loop 19 about stud 11 with the free end 18 extending into the space 17 between lugs 16. This permits any cable, even of a heavy nature, to be formed about the lug 11 very readily and in so attaching the cable to the connector A, I have found that this is a very practical construction for an electrical cable use because it holds the end of the cable after it is formed about the lug 11 and extending between the lugs 16 under the expanding action or tendency of the end of the cable which tends to force the sides of the cable against the lugs 16 in a manner to hold the cable locked to lug 11 and permitting the means for compressing and rigidly securing the cable to the lug and plate to be readily attached.

I provide a compressor plate 20 having a washer like nature, with an inner concave surface 21, a tapered axial opening 22 adapted to extend over the thread stud bolt 11 in a manner so that it will not bind while being rigidly forced into place by the locking nut 23 to firmly hold the cable loop 19 rigidly in place in the connector. The plate 20 is formed with a projecting lip 24, which is also concave in structure, to squeeze the portions of the cable passing between the lugs 16 together.

In this manner, I provide a connector A of a very practical and desirable nature, wherein, the compressor member 20 is adapted to squeeze the loop 19 of the cable closely about the stud or bolt 11 and firmly between forming lugs 16 covering a large surface of the cable and providing an electrical connection of a very low loss nature. My connection is neat in design, simple in construction and practical for operation with the compressor. The plate is held against rotation by the projecting lip 24, extending between the forming lugs and all of the strands of the cable are so firmly pressed together as to provide a connection of practically an integral nature, tests of which have been made as to the electrical loss with my connector, showing that the current loss is extremely low. This makes a very desirable feature in my connector and the design is such as to provide practical utility.

In Figures 5 and 6 I have illustrated another form of my connector A wherein the head portion with the plate 10 is formed with a gripping channel 30 extending transversely to the cable B which is held by the stud 11 and the nut 23 which holds the compressor plate 20 in position. This channel 30 receives the cable C in a manner to hold it extending at approximately right angles or at an angle to the cable B.

A clamping plate 31 is provided with a gripping jaw 32 which is adapted to adjustably grip the cable C within the channel or recess 33 in the plate 31 and by means of the studs 34 and the nuts 35 the plate 31 can be drawn tight against the cable C to squeeze it between the jaw 32 and the channel 30 of the plate 10. The plate 31 is provided with a lip or bearing end 36 which engages against the plate 10 to provide a bearing permitting the plate to rotate or move sufficiently to clamp different sized cables in the channel 30 and 33 just the same as my compressor plate 20 grips the cable B in an adjustable manner so that my connector can be used with different sized cables with equally good results.

This connector illustrated in Figures 5 and 6 provides a strain clamp for clamping and securing the ends of cables and attaching cables together both for electrical purposes and other purposes where it is desired to attach cables.

In accordance with the patent statutes, I have described the principles of operation and formation of my compressor and connecting lug together with the best embodiment therefor, and while I have illustrated a particular formation, I desire to have it understood that the same is only illustrative as a means of carrying out my invention and that the same may be applied to other uses than those above said, without departing from the spirit of my invention within the scope of the following claims:

I claim:

1. An electrical connector for cables including, a plate, a supporting bolt upon said plate, a pair of forming lugs adjacent one end of said plate associated wtih said bolt, a saucer shaped compression plate having a lip extending between said lugs and a nut member adapted to squeeze said compression plate into operative position.

2. An electric connector including, a plate, a threaded bolt member upon said plate, a saucer-shaped compression plate adapted to be carried by said bolt having one side thereof shaped to form a concave lip portion, means for squeezing said compression plate into operative position to force a cable looped below said compression plate against said bolt member and a pair of spaced lugs upon said plate between which said lip member, and the ends of said loop are adapted to extend.

3. An electrical connector for the looped end of a cable including, a flat plate member, open sides thereupon, a bolt extending from said plate, and forming and spacing lugs extending upwardly from the cable receiving end of said plate.

JOHN E. SUMPTER.